United States Patent [19]

Grippe

[11] 4,439,821
[45] Mar. 27, 1984

[54] DC TO DC SWITCHING REGULATOR WITH TEMPERATURE COMPENSATED ISOLATED FEEDBACK CIRCUITRY

[75] Inventor: James M. Grippe, Plano, Tex.

[73] Assignee: Varo, Inc., Garland, Tex.

[21] Appl. No.: 343,744

[22] Filed: Jan. 29, 1982

[51] Int. Cl.³ .......................................... H02P 13/22
[52] U.S. Cl. ........................................ 363/26; 363/97
[58] Field of Search ............................ 363/25, 26, 97

[56] References Cited

U.S. PATENT DOCUMENTS

| | | | |
|---|---|---|---|
| 2,987,664 | 6/1961 | Poirier et al. | |
| 3,418,557 | 12/1968 | Schaefer | |
| 3,584,289 | 6/1971 | Bishop et al. | 331/117 |
| 3,588,666 | 6/1971 | Bertolini | 307/33 |
| 3,660,749 | 5/1972 | Kadri | 331/113 A |
| 3,843,919 | 10/1974 | Yamamura et al. | 363/25 |
| 4,160,288 | 7/1979 | Stuart et al. | 363/26 |
| 4,190,883 | 2/1980 | Cowett | 363/26 |
| 4,196,320 | 4/1980 | Townsend | 363/26 |
| 4,208,706 | 6/1980 | Suzuki et al. | 363/26 |

FOREIGN PATENT DOCUMENTS 2811634 9/1979 Fed. Rep. of Germany ........ 363/25

OTHER PUBLICATIONS

Computer Design, vol. 15, No. 9, p. 46, Sep. 1976.

Primary Examiner—William H. Beha, Jr.
Attorney, Agent, or Firm—Jerry W. Mills; Gregory M. Howison; Nina Medlock

[57] ABSTRACT

A DC to DC switching regulator includes a first pulse width modulator (PWM) (26) and two switching transistors (48) and (50) that are coupled to a transformer (18) to generate an output signal that has pulse widths variable in response to the PWM (26). The output of the transformer (18) is rectified to provide a regulated DC output. A second PWM (78) is provided to convert the amplitude of the regulated DC output to a stream of pulses that are input to an isolation transformer (112) by a push-pull arrangement of transistors (118) and (120). The pulse width of the pulses input to the isolation transformer (112) is variable as a function of the level of the regulated DC and the amplitude thereof is a constant referenced to the internal reference of the PWM (78). The output of the isolation transformer (112) is rectified and filtered to provide an error signal that varies in response to the pulse width of the output pulses from the PWM (78). The constant amplitude, variable width pulses output by the PWM (78) provides a signal that does not vary in response to noise on the regulated DC output and the error signal derived therefrom is input to the PWM (26) to vary the pulse width thereof to maintain regulation on the regulated DC output.

26 Claims, 1 Drawing Figure

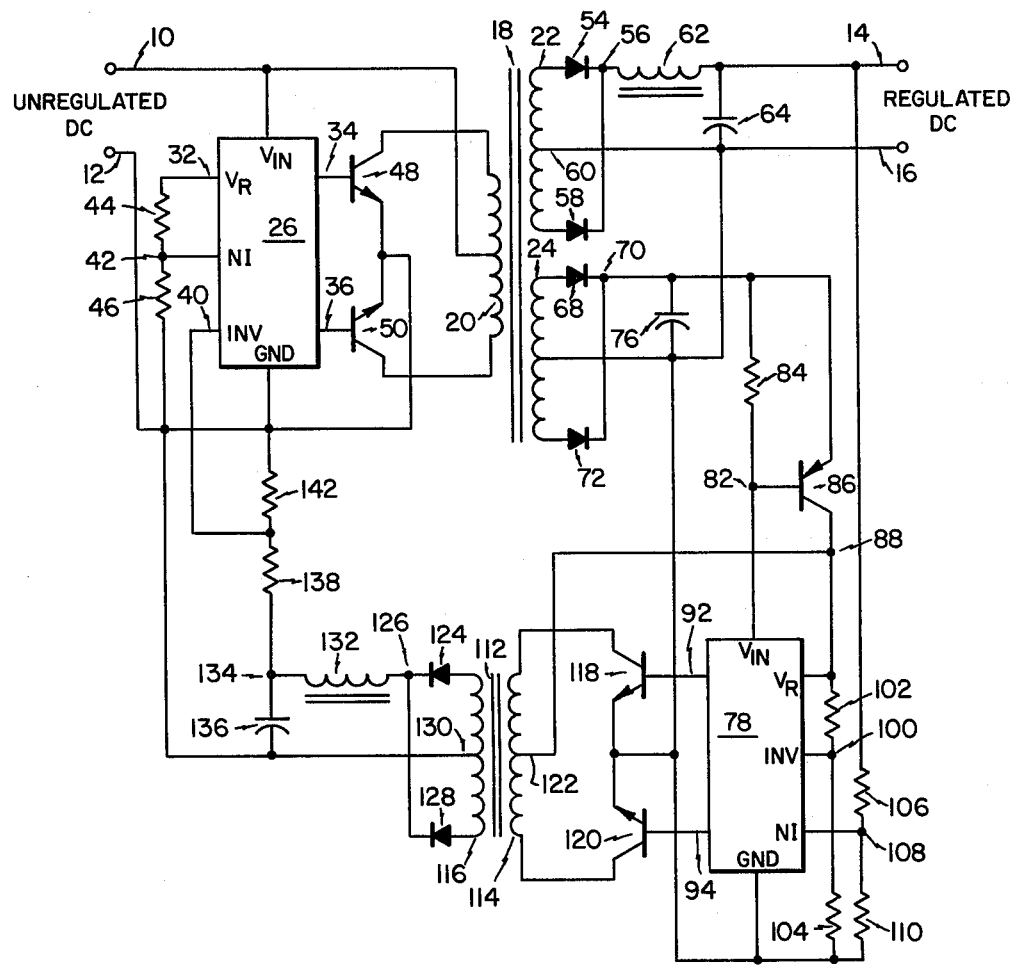

DC TO DC SWITCHING REGULATOR WITH TEMPERATURE COMPENSATED ISOLATED FEEDBACK CIRCUITRY

TECHNICAL FIELD

The present invention pertains to switching regulators and more particularly to switching regulators having a temperature compensated isolated feedback circuit.

BACKGROUND OF THE INVENTION

Switching power supplies that provide a regulated output generally require that the output voltage be sampled and fed back to a control circuit. When specifications require that the output be isolated from the input, present techniques provide two basic alternatives. The first technique is to power the control circuit by the input which requires the sampled output to be fed back through isolating devices such as optocouplers. Since optocouplers have generally poor DC transfer characteristics and very high temperature coefficients, output regulation for this method is often unsatisfactory. The second technique is to power the control circuit from an isolated auxiliary power source referenced to the output with switching components being driven by isolating driver transformers. While regulation achieved through this method may be satisfactory, circuit parts counts and weight can be greatly increased with the use of such circuits.

Isolated switching regulators have previously been disclosed. For example, U.S. Pat. No. 3,660,749 issued to Kadri on May 2, 1972 discloses an isolated DC to DC converter using pulse width modulation. Voltage regulation of the DC to DC converter is accomplished by modulating the pulse width of a driving signal applied to the switching devices. This modulation is synchronized with the switching action of the converter's inverter. For the push-pull type inverters used in the Kadri invention, the modulation control operates in response to successive half cycles of the inverter output having opposite signal polarities.

Although isolated, the feedback method employed in the Kadri patent utilizes flux variation as the feedback method which presents temperature compensation problems. The forward power transfer path has a temperature coefficient path that differs from the temperature path of the feedback path. These differing temperature coefficients result in substantial drift problems over wide temperature variations such as are encountered in military applications.

In view of the above problems with the prior art, there exists a need for isolated feedback circuit having a feedback path with a temperature coefficient equal and opposite to that of the forward power transfer path.

SUMMARY OF THE INVENTION

The present invention comprises a DC to DC switching regulator. A selected embodiment of this circuit includes an unregulated DC voltage which is converted into a first variable pulse signal that is variable in response to both the unregulated DC voltage level and an error signal. The first variable pulse signal is converted to a DC output signal by a first isolation circuit and the output of the isolation circuit is impressed across a DC output terminal and an output ground terminal. A second variable pulse signal is generated that is variable in response to the level of the DC output voltage. The second variable pulse signal is converted to a DC level by a second isolation circuit to provide the error signal. The error signal provides feedback of the output DC level to control the first variable pulse signal, thus regulating the output DC voltage. The output DC level is isolated from both the unregulated DC voltage and from the error signal.

In another aspect of the present invention, the first variable pulse signal has a first temperature coefficient and the second variable pulse signal has a second temperature coefficient that is opposite and equal to the first temperature coefficient. The second temperature coefficient compensates for temperature variations of the first variable pulse signal to provide a temperature compensated regulated DC voltage.

BRIEF DESCRIPTION OF THE DRAWING

For a more complete understanding of the present invention and the advantages thereof, reference is now made to the following description taken in conjunction with the accompanying FIGURE in which the FIGURE illustrates a schematic of the present DC to DC switching regulator.

DETAILED DESCRIPTION OF THE INVENTION

Referring now to the FIGURE, there is shown a schematic diagram of the present invention. An unregulated DC terminal 10 and an input ground terminal 12 are provided for receiving an unregulated DC input voltage. The circuit in the FIGURE outputs a regulated DC voltage across a positive output terminal 14 and an output ground terminal 16.

The unregulated DC on the input and the regulated DC on the output are isolated by a transformer 18. The transformer 18 has a center tapped primary winding 20, a center tapped high voltage secondary winding 22 and a center tapped low voltage secondary winding 24. The secondary winding 22 provides the regulated DC output while the secondary winding 24 provides power for the feedback circuitry as will be described below. It should be understood that the feedback circuitry can derive its power from the secondary winding 22 with the use of some additional circuitry.

A pulse width modulation circuit (PWM) 26 converts a DC voltage to a series of variable width pulses. The PWM 26 has a voltage input $V_{IN}$ connected to the unregulated DC terminal 10 and a ground input (GND) connected to the input ground terminal 12. The PWM 26 has an internal regulator (not shown) that regulates the voltage input to terminal 10 to a predetermined voltage and outputs this regulated voltage from a voltage reference output $V_R$ on a node 32.

The PWM 26 outputs a sequence of variable width pulses on an output terminal 34 and on an output terminal 36. The output terminals 34 and 36 are operable to alternately turn on an external switching device, that is, the output terminal 34 outputs a pulse at one point in time and at some point later in time the output terminal 36 outputs a pulse. At a point later in time the output terminal 34 again outputs a pulse. The time between the pulse output on terminal 34 and the pulse output on terminal 36 is preset by an internal oscillator (not shown) to provide periodicity for the wave form.

The width of the pulses output on the terminals 34 and 36 is controlled by an internal error amplifier (not shown) that has the noninverting input (NI) connected to a node 42 and an inverting input (INV) connected to a node 40. The voltage between the noninverting input and the inverting input determines the width of the pulses output on the terminals 34 and 36. In the present invention, the node 42 has a reference voltage applied to it which is derived by dividing the regulated voltage on node 32 with a series voltage divider comprised of resistors 44 and 46. Resistor 44 has one end thereof connected to node 32 and the other end thereof connected to the node 42. The resistor 46 has one end thereof connected to node 42 and the other end thereof connected to the input ground terminal 12. By varying the value of resistors 44 and 46, the reference voltage at node 42 can be adjusted to any value between the regulated voltage on the terminal 32 and the ground reference on the input ground terminal 12. The inverting input of the PWM 26 is connected to a feedback voltage on node 40 as will be described in more detail below.

The output terminal 34 is connected to the base of an NPN transistor 48. The output terminal 36 is connected to the base of an NPN transistor 50. The emitters of transistors 48 and 50 are connected to the input ground terminal 12. The collector of the transistor 48 is connected to one end of the primary winding 20 and the collector of transistor 50 is connected to the other end thereof. The center tap of primary winding 20 is connected to the unregulated DC terminal 10.

When a pulse is applied to the base of the transistor 48 from the output terminal 34, the transistor 48 becomes saturated, thus grounding one end of the primary winding 20. This impresses a pulse across the primary winding 20 between the collector of the transistor 48 and the center tap thereof. This pulse is coupled through the transformer 18 to the secondary windings 22 and 24. After a preset time period has elapsed, a pulse is output on the output terminal 36 to the base of the transistor 50. This, in turn, saturates the transistor 50 and grounds the other end of the primary winding 20. This impresses a pulse across the primary winding 20 between the collector of the transistor 50 and the center tap thereof. This pulse is coupled through the transformer 18 to the secondary windings 22 and 24. It is important to note that the pulse generated by the transistor 50 induces a signal in the secondary windings 22 and 24 of the opposite polarity to that generated from the transistor 48. This in effect gives a positive and negative going signal on the output of the secondary windings 22 and 24. This is a push-pull configuration, the operation of which is described in U.S. Pat. No. 3,351,840 issued to L. E. Yearley.

A diode 54 has the anode thereof connected to one end of the secondary winding 22 and the cathode thereof connected to a node 56. A diode 58 has the anode thereof connected to the other end of the secondary winding 22 and the cathode thereof connected to the node 56. The secondary winding 22 has the center tap thereof connected to the output ground terminal 16.

An inductor 62 has one end thereof connected to the node 56 and the other end thereof connected to the positive output terminal 14. A capacitor 64 has one end thereof connected to the positive output terminal 14 and the other end thereof connected to the output ground terminal 16. The diodes 54 and 58 provide full wave rectification of the signal across the secondary winding 22. The combination of the capacitor 64 and the inductor 62 provide filtering for the rectified signal on node 56 to provide a DC output on the positive output terminal 14.

A diode 68 has the anode thereof connected to one end of the secondary winding 24 and the cathode thereof connected to a node 70. A diode 72 has the anode thereof connected to the other end of the secondary winding 24 and the cathode thereof connected to the node 70. The secondary winding 24 has the center tap terminal thereof connected to the output ground terminal 16. A capacitor 76 has one end thereof connected to the node 70 and the other end thereof connected to the output ground terminal 16. The diodes 68 and 72 provide full wave rectification of the signal across the secondary winding 24. The capacitor 76 filters the full wave rectified signal from the diodes 68 and 72 to provide a DC level on the node 70.

A pulse width modulation circuit (PWM) 78 provides the capability for generating a sequence of variable width pulses to drive a switching circuit that generates a feedback signal to control the PWM 26. The PWM 78 operates in a similar manner to the PWM 26. The PWM 78 has a voltage input terminal $V_{IN}$ that is connected to a node 82. A resistor 84 has one end thereof connected to the node 82 and the other end thereof connected to the node 70. A PNP transistor 86 has the base terminal thereof connected to the node 82, the emitter terminal thereof connected to the node 70 and the collector terminal thereof connected to a node 88. The PWM 78 has a regulated voltage terminal $V_R$ connected to the node 88. The regulated voltage terminal $V_R$ of the PWM 78 operates in a similar manner to the regulated voltage terminal $V_R$ of the PWM 26.

The PWM 78 has an output terminal 92 and an output terminal 94 that operate in a similar manner to the output terminals 34 and 36 of the PWM 26. The PWM 78 also has an internal error amplifier (not shown) having an inverting input INV and a noninverting input NI. The inverting input INV is connected to a node 100 that provides a reference voltage for the internal error amplifier. A resistor 102 has one end thereof connected to the node 88 and the other end thereof connected to the node 100. A resistor 104 has one end thereof connected to the node 100 and the other end thereof connected to the output ground terminal 16. The resistors 102 and 104 provide a voltage divider that divides the reference voltage on the reference voltage terminal $V_R$ of the PWM 78 to a reference voltage on the node 100. By varying the values of the resistors 102 and 104 the voltage level of the node 100 can be adjusted.

A resistor 106 has one end thereof connected to the positive output terminal 14 and the other end thereof connected to a node 108. A resistor 110 has one end thereof connected to the node 108 and the other end thereof connected to the output ground terminal 16. The noninverting input NI of the PWM 78 is connected to the node 108. The resistors 106 and 110 provide a voltage divider to divide the voltage level on the positive output terminal 14 to a lower voltage for input on the noninverting input terminal of the PWM 78. This provides a sampled voltage for the PWM 78.

An isolation transformer 112 has a center tapped primary winding 114 and a center tapped secondary winding 116. A NPN transistor 118 has the base thereof connected to the output terminal 92, the emitter terminal thereof connected to the output ground terminal 16 and the collector terminal thereof connected to one end of the primary winding 114. A NPN transistor 120 has the base terminal thereof connected to the output terminal 94, the emitter terminal thereof connected to the output ground terminal 16 and the collector terminal thereof connected to the other end of the primary winding 114. The primary winding 114 has the center tap thereof connected to the node 88.

A diode 124 has the anode thereof connected to one end of the secondary winding 116 and the cathode thereof connected to a node 126. A diode 128 has the anode thereof connected to the other end of the secondary winding 116 and the cathode thereof connected to the node 136. The secondary winding 116 has the center tap thereof connected to the input ground terminal 12. An inductor 132 has one end thereof connected to the node 126 and the other end thereof connected to a node 134. A capacitor 136 has one end thereof connected to the node 134 and the other end thereof connected to the input ground terminal 12. The diodes 124 and 128 provide full wave rectification of the signal output from the secondary winding 116. The inductor 132 and the capacitor 136 provide filtering of the rectified signal on the node 126.

A resistor 138 has one end thereof connected to the node 134 and the other end thereof connected to the node 40. A resistor 142 has one end thereof connected to the node 40 and the other end thereof connected to the input ground terminal 12. The resistors 138 and 142 form a voltage divider for the voltage on the node 134 to provide a lower voltage on the node 40. The node 40 provides a feedback signal level for input to the inverting input INV of the PWM 26.

Referring further to the FIGURE, the operation of the present invention will be described in more detail. The switching transistors 48 and 50 are switched in such a manner to provide variable width pulses at a level determined by the input voltages to the error amplifier of the PWM 26. When one of the switching transistors 48 or 50 saturates and connects one end of the primary winding 20 to ground, the transformer 18 couples the pulse input to the primary winding 20 over to the secondary windings 22 and 24. As the transistor 48 or 50 saturates, current flows from the terminal 10 through the primary winding 20 to the input ground terminal 12. An induced current is caused to flow into the secondary windings 22 and 24. The output waveform on the secondary windings 22 and 24 is in the form of a three-stage quasi-square waveform with a pulse duration time equal to the saturation time of the transformer 18. The diodes 54 and 58 rectify this waveform and the filter comprised of the capacitor 64 and the inductor 62 averages the amount of energy stored within the rectified waveform to the RMS value. This RMS value changes as both the level of the unregulated DC on the terminal 10 changes and the width of the pulses output by the PWM 26 changes.

The actual DC level on terminal 14 is input to the voltage divider comprised of the resistors 106 and 110 to provide a sample voltage on the node 108. This sample voltage is input to the noninverting input NI of the PWM 78. The internal error amplifier of the PWM 78 has its inverting input INV connected to the reference voltage on the node 100. As the voltage on the node 108 increases or decreases with respect to the voltage on the node 100, the pulse width on the output terminals 92 and 94 correspondingly increases or decreases. This variable width pulse is coupled over into the secondary winding 116 of the transformer 112. The peak voltage level is held constant by the combination of the resistor 84, the transistor 86 and the internal voltage reference of the PWM 78. This allows the pulse width to be the only variable that changes in the feedback path. As the pulse width changes, the width of the rectified waveform on the node 126 also varies. The filter comprised of the inductor 132 and the capacitor 136 filters the varying waveform on the node 126 to provide a DC level on the node 134 that varies proportionally to the voltage on node 14. The voltage on the node 134 is input to the voltage divider comprised of the resistors 138 and 142 to provide a feedback voltage or error voltage on the node 40 that is input to the inverting input INV of the PWM 26. The operation of the PWM 78 and the transformer 112 is similar to that described above with respect to the PWM 26 and the transformer 18.

When the unregulated DC across the terminals 10 and 12 initially increases, this causes a higher level signal to be coupled across the transformer 18 to the secondary winding 22. This in turn causes the voltage level on the terminal 14 to increase, thus increasing the sample voltage on the node 108. As the voltage on the noninverting input of the PWM 78 increases with respect to the voltage on the inverting terminal thereof, the width of the pulses on the output terminals 92 and 94 is varied. These varying width pulses are coupled across the transformer 112 to the secondary winding 116 to provide varying width rectified pulses on the node 126. This causes the DC voltage on the nodes 134 and 40 to increase with increasing pulse widths and decrease with decreasing pulse widths. As the voltage on the node 40 varies, the input voltage level to the inverting input INV of the PWM 26 also varies. This completes the feedback loop for the circuit of the present invention. Since the sampled voltage is input to the noninverting input NI of the PWM 78 and the inverting input INV thereof is connected to a reference voltage, the feedback path provides negative feedback as compared to the forward power transfer path. This is because the error voltage on the node 40 is input to the inverting input INV of the PWM 26.

When the unregulated DC voltage across the terminals 10 and 12 increases, the voltage level on the positive output terminal 14 also increases since the center tap of the primary winding 20 is connected to the terminal 10. This increasing voltage on terminal 14 is sampled by the PWM 78 and the width of the pulses on the output terminals 92 and 94 is varied, thus decreasing the voltage on the node 40. The decreasing voltage on the node 40 is input to the inverting input INV of the error amplifier on the PWM 26 to vary the width of the pulses on the output terminals 34 and 36. This varying pulse width causes the voltage on the positive output terminal 14 to decrease until the proper regulation is achieved. The feedback method thus provides a regulated DC voltage that is controlled by the voltage set at both the noninverting input NI on the PWM 26 and the voltage on the inverting input INV of the PWM 78. It should be understood that for a decreasing voltage on the input terminal 10 the reverse of the above described steps also provides a regulated output.

An important aspect of the present invention is that the PWM 26 and the PWM 78 have identical temperature characteristics. The device normally utilized for the PWM 26 and the PWM 78 is an SG1524 manufactured by Silicon General Inc. A temperature variation in the frequency of the internal oscillator or the voltage level of the reference voltage $V_R$ of the PWM 26 corresponds to an equal variation in the PWM 78. However, since there is a 180° phase shift in the feedback path, the equal variation in the PWM 78 results in an opposite variation in the feedback or error voltage on node 40 that is input to the PWM 26. The result is that the forward transfer path and the feedback path provide a temperature compensated and isolated output DC regulated voltage.

In summary, the present invention provides a first pulse width modulation circuit for varying the amount of energy within a given pulse that is coupled across an isolation transformer for rectification and filtering. The feedback circuit includes a separate pulse width modulation circuit that is identical to the first pulse width modulation circuit with isolation in the feedback path. The temperature characteristics of both pulse width modulation circuits are identical, thus providing temperature compensation in addition to full isolation in both the forward and reverse direction.

Although the preferred embodiment of the invention has been described in detail, it should be understood that various changes, substitutions and alterations can be made therein without departing from the spirit and scope of the invention as defined by the appended claims.

I claim:

1. A DC to DC switching regulator for an unregulated DC signal comprising:
    first means for converting the unregulated DC signal into a first variable pulse width signal,
    first isolation means for receiving and converting said first variable pulse width signal into an output DC signal, said output DC signal isolated from the unregulated DC signal;
    second means for converting said isolated output DC signal into a second variable pulse width signal said second variable pulse signal having constant amplitude pulses with a variable width, the amplitude thereof independent of said isolated output DC signal;
    second isolation means for receiving said second variable pulse width signal and generating an isolated pulse signal, said isolated pulse signal having variable width pulses corresponding to the pulse width of said variable pulse width signal and a constant amplitude; and
    means for converting said isolated pulse signal into an error signal, said error signal isolated from said DC output signal;
    said error signal and the level of the unregulated DC signal determining the level of said output DC signal and the level of said output DC signal determining the level of said error signal, such that said error signal provides an isolated feedback signal that is 180 degrees out of phase to regulate said output DC signal.

2. The DC to DC switching regulator of claim 1 wherein said first means for converting comprises a pulse width modulator for generating a stream of pulses having a variable pulse width.

3. The DC to DC switching regulator of claim 1 wherein said first isolation means comprises a transformer having a primary and a secondary, said primary receiving said first variable pulse signal and a circuit for rectifying and filtering the output of said secondary to provide said output DC signal.

4. The DC to DC switching regulator of claim 1 wherein said second means for converting comprises a pulse width modulator for converting said output DC signal into a stream of pulses having a variable pulse width.

5. The DC to DC switching regulator of claim 1 wherein said second isolation means comprises a transformer having a primary winding and a secondary winding, said primary winding receiving said second variable pulse signal and said means for converting comprises a circuit for rectifying and filtering the output of said secondary winding to provide said error signal.

6. The DC to DC switching regulator of claim 1 wherein said first isolation means has a first temperature coefficient and said second isolation means has a second temperature coefficient equal and opposite to said first temperature coefficient such that temperature variations in said DC output signal resulting from said first isolation means are compensated by said second isolation means.

7. A DC to DC switching regulator for an unregulated DC input signal comprising:
    a DC input terminal and an input ground terminal for receiving the unregulated DC input signal;
    a DC output terminal and an output ground terminal for outputting a regulated DC output signal;
    first means for converting said unregulated DC signal into a first stream of pulses, each pulse having a variable pulse width and an amplitude corresponding to the level of said unregulated DC input signal;
    first isolation means having an input for receiving said first stream and an output connected between said DC output terminal and said output ground terminal, said first isolation means converting said first stream into said regulated DC output signal, said regulated DC output signal isolated from said unregulated DC input signal;
    second means for converting said regulated DC signal into a second stream of pulses, each pulse having a variable pulse width and a constant amplitude independent of the amplitude of said regulated DC signal, said pulse width variable in response to the DC level of said regulated DC output signal; and
    second isolation means having an input for receiving said second stream of pulses and converting said second stream of pulses into an error signal, said error signal referenced to said input ground terminal and isolated from said regulated DC output signal such that only variations in the pulse width of said second stream of pulses varies said error signal, wherein said second means for converting and said second isolation means provide an isolated feedback path 180 degrees out of phase with said DC signal, said error signal operable to vary the pulse width of each pulse in said first stream to provide regulation of said DC output signal.

8. The DC to DC switching regulator of claim 7 wherein said first means for converting comprises:
    a pulse width modulator for generating an intermediate stream of pulses having a variable pulse width, the pulse width variable in response to said error signal; and
    a switching circuit having an input and an output, the input for receiving the intermediate stream of pulses and providing said first stream on the output and referenced to said unregulated DC, said first stream of pulses directly corresponding in timing and pulse width to said intermediate stream of pulses.

9. The DC to DC switching regulator of claim 7 wherein said first isolation means comprises:

a transformer having a primary winding and a secondary winding, said primary winding for receiving said first stream and coupling said first stream to said secondary winding;

a rectifying circuit for rectifying the output of said secondary winding; and a filtering circuit having an input and an output, the input of said filtering circuit connected to the output of said secondary winding and the output of said filtering circuit connected between said DC output terminal and said output ground terminal.

10. The DC to DC switching regulator of claim 7 wherein said second means for converting comprises:

a sampling circuit for sampling the regulated DC output signal and generating a sample signal;

a pulse width modulator for generating a stream of intermediate pulses having a variable pulse width, the pulse width variable in response to said sample signal; and a switching circuit having an input and an output, the input for receiving said intermediate stream and the output for outputting said second stream.

11. The DC to DC switching regulator of claim 7 wherein said second isolation means comprises:

a transformer having a primary winding and a secondary winding, the primary winding for receiving said second stream and the secondary winding for outputting an AC signal directly corresponding to said second stream;

a rectifying circuit for rectifying the output of said secondary winding to provide a rectified signal; and a filtering circuit having an input and an output, the input thereof for receiving said rectified signal, the output thereof referenced to said input ground terminal, said filtering circuit outputting said error signal.

12. The DC to DC switching regulator of claim 7 wherein said first means for converting and said second means for converting have equal and opposite temperature coefficients.

13. A DC to DC switching regulator comprising:

a DC input terminal and an input ground terminal for receiving an unregulated DC input signal;

a DC output terminal and an output ground terminal for outputting a regulated DC output signal;

a first pulse generating circuit for generating:
  a first stream of pulses, and
  a second stream of pulses, the width of the pulses in said first and second stream variable in response to an error signal, the pulses in said first stream alternating with the pulses in said second stream;

a first switching circuit for receiving the first stream of pulses generated by said first pulses generating circuit;

a second switching circuit for receiving the second stream of pulses generated by said first pulse generating circuit;

a first transformer having:
  a center tapped primary with the center tap thereof connected to said DC input terminal, said primary having a first and second end terminal connected to the output of said first and second switching circuits respective, and
  a center tap secondary with the center tap thereof connected to said output ground terminal, said secondary having a first and second end terminal for outputting a first isolated signal;

a first rectifying circuit for receiving and rectifying said first isolated signal;

a first filter circuit for receiving and filtering the output of said rectifying circuit, the output of said filter circuit connected to said DC output terminal;

a sample circuit for sampling said DC output signal to provide a sample signal;

a second pulse generating circuit for generating;
  a first stream of pulses, and
  a second stream of pulses, the width of the pulses in said first and second stream variable in response to said sample signal, the pulses in said first stream alternating with the pulses in said second stream;

a third switching circuit for receiving the first stream of pulses generated by said second pulse generating circuit;

a fourth switching circuit for receiving the second stream of pulses generated by said second pulse generator circuit;

a second transformer having:
  a center tapped primary with the center tap thereof connected to a DC reference voltage that is independent of said DC output signal, said primary having a first and second end terminal for receiving the output of said third and fourth switching circuits respectively, and
  a center tap secondary with the center tap thereof connected to said input ground terminal, said secondary having a first and second end terminal for outputting a second isolated signal that has a series of pulses corresponding to the combined pulses output by said third and fourth switching circuits with only the width thereof varying and not the amplitude, a second rectifying circuit for receiving and rectifying said second isolated signal;

a second filter circuit for filtering the output of said rectifying circuit, the output of said second filter circuit providing said error signal wherein said second transformer provides an isolated feedback path for said error signal that is 180 degrees out of phase with said DC output signal and said first transformer provides an isolated forward power transfer path to provide an isolated DC to DC regulating circuit.

14. The DC to DC switching regulator circuit of claim 13 wherein said first pulse generating circuit comprises a pulse width modulator.

15. The DC to DC switching regulator of claim 13 wherein said first switching circuit comprises an NPN transistor having the emitter thereof connected to said input ground terminal, the collector thereof connected to the first end terminal of the primary of said first transformer and the base thereof for receiving the first stream of pulses generated by said first pulse generating circuit.

16. The DC to DC switching regulator of claim 13 wherein said second switching circuit comprises an NPN transistor having the emitter thereof connected to said input ground terminal, the collector thereof connected to the second end terminal of the primary of said first transformer and the base thereof for receiving the second stream of pulses generated by said first pulse generating circuit.

17. The DC to DC switching regulator of claim 13 wherein said first rectifying circuit comprises a first diode having the anode thereof connected to the first end terminal of the secondary of said first transformer, a second diode having the anode thereof connected to the second end terminal of the secondary of said first transformer and the cathode thereof connected to the cathode of said first diode.

18. The DC to DC switching regulator of claim 13 wherein said first filter circuit comprises an inductor having one end thereof connected to the output of said first rectifying circuit and the other end thereof connected to said DC output terminal and a capacitor having one end thereof connected to said DC output terminal and the other end thereof connected to said output ground terminal.

19. The DC to DC switching regulator of claim 13 wherein said sample circuit comprises a first resistor having one end thereof connected to said DC output terminal and a second resistor having one end thereof connected to the other end of said first resistor and the other end thereof connected to said output ground terminal to provide a voltage dividing circuit.

20. The DC to DC switching circuit of claim 13 wherein said second pulse generating circuit comprises a pulse width modulator.

21. The DC to DC switching regulator of claim 13 wherein said third switching circuit comprises an NPN transistor having the emitter thereof connected to said output ground terminal, the collector thereof connected to the first end terminal of the primary of said second transformer and the base thereof for receiving the first stream of pulses from said second pulse generating circuit.

22. The DC to DC switching regulator of claim 13 wherein said fourth switching circuit comprises an NPN transistor having the emitter thereof connected to said output ground terminal, the collector thereof connected to the second end terminal of the primary of said second transformer and the base thereof for receiving the second stream of pulses generated by said second pulse generating circuit.

23. The DC to DC switching regulator of claim 13 wherein said second rectifying circuit comprises a first diode having the anode thereof connected to the first output terminal of the secondary of said second transformer and a second diode having the anode thereof connected to the second output terminal of the secondary of said second transformer and the cathode thereof connected to the cathode of said first diode.

24. The DC to DC switching regulator of claim 13 wherein said second filter circuit comprises an inductor having one end thereof connected to the output of said second rectifying circuit and the other end thereof for outputting said error signal and a capacitor having one end thereof connected to the other end of said inductor and the other end thereof connected to said input ground terminal.

25. The DC to DC switching regulator of claim 13 wherein said first and second pulse generation circuits have identical temperature coefficients.

26. A DC to DC switching regulator method for an unregulated DC signal comprising:
converting the unregulated DC signal into a first variable pulse signal having pulses with variable widths and an amplitude equal to the unregulated DC signal,
receiving and converting the first variable pulse signal into an output DC signal, the output DC signal isolated from the unregulated DC signal and the level thereof determined by the width of of the pulses in said first pulse signal;
converting the output DC signal into a second variable pulse signal having variable pulse widths dependent upon said DC output signal and a constant amplitude independent of said DC output signal; and
receiving and converting the second variable pulse signal into an error signal, the error signal isolated from the DC output signal and variable in response to variations of the pulse width of said second signal,
the error signal and the level of the unregulated DC signal determining the level of the output DC signal and the level of the output DC signal determining the level of the error signal, such that the error signal provides an isolated feedback signal that is 180 degrees out of phase to regulate the output DC signal.

* * * * *

UNITED STATES PATENT AND TRADEMARK OFFICE
CERTIFICATE OF CORRECTION

PATENT NO. : 4,439,821

DATED : March 27, 1984

INVENTOR(S) : James M. Grippe

It is certified that error appears in the above-identified patent and that said Letters Patent is hereby corrected as shown below:

Col. 5, line 9, "node 136" should be --node 126--.

Col. 8, line 51, between "DC" and "signal," insert --output--.

Col. 9, line 54, "first pulses generating" should be --first pulse generating--.

Signed and Sealed this

Twenty-first Day of August 1984

[SEAL]

Attest:

GERALD J. MOSSINGHOFF

Attesting Officer

Commissioner of Patents and Trademarks